Aug. 7, 1934.   E. RICARD ET AL   1,969,237
MANUFACTURE OF ACETIC ACID AND LACTIC ACID
Filed July 25, 1929
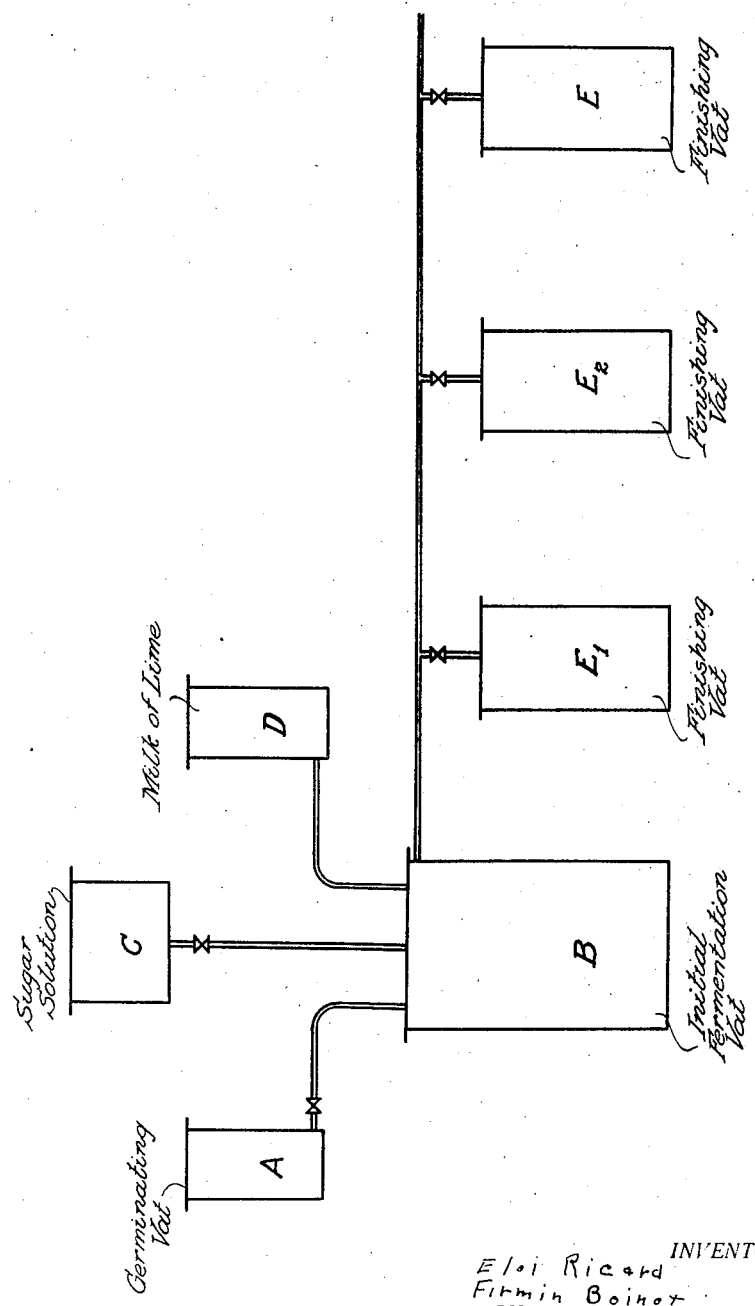
INVENTORS
Eloi Ricard
Firmin Boinot
BY
Francis M. Crawford ATTORNEYS.

Patented Aug. 7, 1934

1,969,237

UNITED STATES PATENT OFFICE 1,969,237

MANUFACTURE OF ACETIC ACID AND LACTIC ACID

Eloi Ricard and Firmin Boinot, Melle, France, assignors to Usines de Melle

Application July 25, 1929, Serial No. 380,907
In Belgium July 27, 1928

15 Claims. (Cl. 260—120)

This invention relates to the manufacture of acetic acid and lactic acid by fermentation.

It is known that micro-organisms are found in nature, which are capable of decomposing certain sugars with the production of lactic acid and acetic acid in extremely variable proportions. Hitherto, however, the known or described organisms have had no advantageous application, owing to the fact that they work in dilute media (20 to 30 grams of sugar per litre) and because the time occupied in fermentation is long (at least two weeks).

We have discovered a strain of bacteria of the type lacto-bacillus acidophilus B which differs from the known species in that it ferments worts containing high concentrations of sugar (for example, 100 to 120 grams per liter) in two or three days with a high yield of lactic and acetic acids. This strain of bacteria will be referred to herein as lacto-bacillus acidophilus B'.

These bacteria exist in the natural bacterial flora of milk. Their selection is effected by acting on a culture medium containing 10% sugar. The samples taken in culture tubes are tested on natural sugar worts (molasses, sugar-beet juice and the like) at a temperature of 38° C. and with a lactic acid content of 25 to 30 grams per litre until the species of bacteria is found evolving rapidly in such a medium.

The lacto-bacillus acidophilus generally assumes a filamentous form (divided or not), but its shape varies according to its age and the nature of the medium in which it works. It strongly ferments glucose, saccharose, the pentoses, maltose and lactose, producing lactic acid and acetic acid by decomposing the sugars, without giving off gas. Its optimum temperature of development is 38-40° C.; it resists a temperature of 45° C. but is killed at 50° C. For this reason it cannot be numbered among the true thermophiles such as bacillus Delbruckii and others, which are only capable of working normally at 55° C. and over.

A number of morphological characteristics of the lacto-bacillus acidophilus cause it to resemble bacillus bulgaricus; it differs essentially therefrom however, in that it strongly attacks saccharose.

On the other hand the "lacto-bacillus acidophilus B" must not be confused with organisms of the type "lacto-bacillus penta-aceticus" as it works normally at a temperature of 38 to 40° C. whereas the ferments of the type lacto-bacillus penta-aceticus have their optimum temperature in the neighbourhood of 30° C.

The following examples are given to demonstrate the simplicity of the industrial utilization of our improved strain, lacto-bacillus acidophilus B; reference being made to the accompanying drawing which is a diagrammatic illustration of the process.

Example 1: Fermentation of saccharose

A germinating vat A is charged with 10 hecto litres of molasses or sugar-beet juice containing 30 grams of sugar per litre. The contents are sterilized and cooled to 38° C. and are then seeded with a pure culture of our improved strain, lacto-bacillus acidophilus B'. After two or three days the acidity of the contents amounts to 25 grams per litre and nearly all the sugar is fermented. The barm is then poured into the vat B open to the air and having a capacity of 400 hecto-litres; sugary juice containing, for example, 100 grams of sugar per litre and coming from the vessel C, is next run in and then milk of lime coming from the vessel D is added so as to maintain in the vat B an acidity of 20 grams per litre and a dose of free sugar of 8 to 10 grams per litre.

When the vat B is full, it overflows into the vats $E_1$, $E_2$ etc. ...., where the fermentation is completed.

The vat B may thus receive daily 200 hecto-litres of sugary juice of 10% sugar content corresponding to a production of 2000 kgs. of acid per day, and this can be done indefinitely. The fermentation ceases when the feed of sugary juice is suspended and is rapidly resumed when the feed is recommenced, even after a stoppage of many months.

The fermented wort from the vats $E_1$, $E_2$, etc. ...., is neutralized with a slight excess of lime so as to obtain clarification; it is then filtered and evaporated so as to concentrate the lactates and acetates formed to a suitable concentration. The acetic acid and the lactic acid are then extracted by known processes.

The fermentation being exothermic, the sugar solution emanating from the container C must be at a temperature below 38° C. which varies according to the surroundings.

The fermentation of glucose, maltose and lactose is effected exactly under the same conditions as that of saccharose.

Example 2: Fermentation of pentoses

This fermentation is also effected under the same conditions as those described above. It is, however, necessary first to prepare the pentose wort in the following manner:

Wood, previously split up into minute chips, or the shell husks of oats or generally any other vegetable matter containing pentosans, is or are placed in a series of vats forming a maceration or extraction battery. Water acidified with 20 grams sulphuric acid per litre is caused to pass through the vats at a temperature between 85 and 95°. The flow of acidified water is regulated in such a manner that at the end of the battery the extract contains at least 100 to 120 grams of pentose per litre.

This extract is neutralized with lime, phosphate and nitrogenous material being added as nutrient substances, for the development of the bacteria.

Instead of employing water for making the pentose extract, very weak vinasses derived, for example from alcoholic or butylacetonic fermentation may be used thus avoiding the expense of the necessary nutrient media for the development of the bacteria. The pentose extract thus obtained ferments as well as the sugars previously indicated.

What we claim is:—

1. In a process for the manufacture of acetic and lactic acids by fermentation, the step which comprises inoculating the wort with a culture of the type lacto-bacillus acidophilus B, said culture having an optimum temperature of 38–40° C. and having the ability to ferment worts containing high concentrations of sugar in the presence of high concentrations of free lactic acid.

2. In a process for the manufacture of acetic and lactic acids by fermentation, the step which comprises inoculating the wort with a culture of the type lacto-bacillus acidophilus B, said culture having an optimum temperature of 38–40° C. and having the ability to ferment worts containing 10% sugar and 3% lactic acid.

3. In a process for the manufacture of acetic and lactic acids by fermentation, the steps which comprise inoculating a wort containing a high concentration of sugar with a culture of the type lacto-bacillus acidophilus B, said culture having an optimum temperature of 38–40° C. and having the ability to ferment worts containing high concentrations of sugar in the presence of high concentrations of free lactic acid, and subjecting said worts to fermentation at a temperature of substantially 38–40° C.

4. In a process for the manufacture of acetic and lactic acids by fermentation, the steps which comprise inoculating a wort containing 10% of sugar with a culture of the type lacto-bacillus acidophilus B, said culture having an optimum temperature of 38–40° C. and having the ability to ferment worts containing 10% sugar and 3% lactic acid, and subjecting said worts to fermentation at a temperature of substantially 38–40° C.

5. In a process for the manufacture of acetic and lactic acids by fermentation, the steps which comprise inoculating a wort containing a high concentration of sugar with a culture of the type lacto-bacillus acidophilus B, said culture having an optimum temperature of 38–40° C. and having the ability to ferment worts containing high concentrations of sugar in the presence of high concentrations of free lactic acid, and subjecting said worts to fermentation at a temperature of substantially 38–40° C. while controlling the acidity of the wort, whereby the free acid content is maintained between 2 and 3%.

6. In a process for the manufacture of acetic and lactic acids by fermentation, the steps which comprise inoculating a wort containing 10% of sugar with a culture of the type lacto-bacillus acidophilus B, said culture having an optimum temperature of 38–40° C. and having the ability to ferment worts containing 10% sugar and 3% lactic acid, and subjecting said wort to fermentation at a temperature of substantially 38–40° C. while controlling the acidity of the wort, whereby the free acid content is maintained between 2 and 3%.

7. In a process for the manufacture of acetic and lactic acids by fermentation, the step which comprises inoculating with a culture of the type lacto-bacillus acidophilus B, having an optimum temperature of 38–40° C. and having the ability to ferment worts containing high concentrations of sugar in the presence of high concentrations of free lactic acid, pentose-containing worts obtained by extracting pentosan-containing materials at 85–95° C. with a dilute mineral acid solution.

8. In a process for the manufacture of acetic and lactic acids by fermentation, the step which comprises inoculating with a culture of the type lacto-bacillus acidophilus B, having an optimum temperature of 38–40° C. and having the ability to ferment worts containing 10% sugar and 3% lactic acid, pentose-containing worts obtained by extracting pentosan-containing materials at 85–95° C. with a dilute mineral acid solution.

9. In a process for the manufacture of acetic and lactic acids by fermentation, the step which comprises inoculating with a culture of the type lacto-bacillus acidophilus B, having an optimum temperature of 38–40° C. and having the ability to ferment worts containing high concentrations of sugar in the presence of high concentrations of free lactic acid, pentose-containing worts obtained by extracting pentosan-containing materials at 85–95° C. with weakly acidified vinasses derived from other fermentations.

10. In a process for the manufacture of acetic and lactic acids by fermentation, the step which comprises inoculating with a culture of the type lacto-bacillus acidophilus B, having an optimum temperature of 38–40° C. and having the ability to ferment worts containing 10% sugar and 3% lactic acid, pentose-containing worts obtained by extracting pentosan-containing materials at 85–95° C. with weakly acidified vinasses derived from other fermentations.

11. In a process for the manufacture of acetic and lactic acids by fermentation, the step which comprises inoculating the wort with a culture obtained by inoculating with the mould of milk a culture medium containing 10% sugar and subculturing in said media while maintaining the acidity between 2 and 3% of free acid.

12. In a process for the manufacture of acetic and lactic acids by fermentation, the steps which comprise inoculating the wort with a culture obtained by inoculating with the bacterial flora of milk a culture medium containing 10% sugar and subculturing in said media while maintaining the acidity between 2 and 3% of free acid, and subjecting said wort to fermentation at a temperature of substantially 38–40° C.

13. In a process for the manufacture of acetic and lactic acids by fermentation, the steps which comprise inoculating the wort with a culture obtained by inoculating with the bacterial flora of milk a culture medium containing 10% sugar and subculturing in said media while maintaining the acidity between 2 and 3% of free acid, and subjecting said wort to fermentation at a temperature of substantially 38–40° C, while controlling the acidity of the wort, whereby the free acid content is maintained between 2 and 3%.

14. In a process for the manufacture of acetic and lactic acids by fermentation, the step which comprises inoculating with a culture obtained by inoculating with the bacterial flora of milk a culture medium containing 10% sugar and subculturing in said media while maintaining the acidity between 2 and 3% of free acid, pentose-containing worts obtained by extracting pentosan-containing materials at 85–95° C. with a dilute mineral acid solution.

15. In a process for the manufacture of acetic and lactic acids by fermentation, the step which comprises inoculating with a culture obtained by inoculating with the bacterial flora of milk a culture medium containing 10% sugar and subculturing in said media while maintaining the acidity between 2 and 3% of free acid, pentose-containing worts obtained by extracting pentosan-containing materials at 85–95° C. with weakly acidified vinasses derived from other fermentations.

ELOI RICARD.
FIRMIN BOINOT.